(12) United States Patent
Cozza et al.

(10) Patent No.: US 9,045,153 B2
(45) Date of Patent: Jun. 2, 2015

(54) AUTOMATICALLY LOCKING LIFTING SYSTEM FOR DISPLAY CASES

(76) Inventors: Frank Cozza, Santee, CA (US); Gerry Taylor, Carlsbad, CA (US)

( * ) Notice: Subject to any disclaimer, the term of this patent is extended or adjusted under 35 U.S.C. 154(b) by 925 days.

(21) Appl. No.: 13/230,828

(22) Filed: Sep. 12, 2011

(65) Prior Publication Data

US 2012/0126189 A1     May 24, 2012

Related U.S. Application Data

(60) Provisional application No. 61/381,838, filed on Nov. 22, 2010.

(51) Int. Cl.
| | |
|---|---|
| *B65F 9/00* | (2006.01) |
| *B62B 5/00* | (2006.01) |
| *B66F 3/36* | (2006.01) |
| *A47B 97/00* | (2006.01) |
| *B62B 3/06* | (2006.01) |

(52) U.S. Cl.
CPC ............ *B62B 5/0083* (2013.01); *B62B 5/0089* (2013.01); *A47B 97/00* (2013.01); *B62B 3/0606* (2013.01); *B62B 2202/30* (2013.01)

(58) Field of Classification Search
CPC ............ A47F 13/00; B66F 5/00; B66F 15/00; B62B 1/26; B62B 5/0089; B62B 5/0083
USPC ............ 254/2 R, 10 R, 10 B, 93 H, 134, 7 R; 280/79.7, 79.11; 414/373
See application file for complete search history.

(56) References Cited

U.S. PATENT DOCUMENTS

2007/0194546 A1 *   8/2007   Cozza ...................... 280/47.131

* cited by examiner

*Primary Examiner* — Lee D Wilson
*Assistant Examiner* — Seahee Yoon
(74) *Attorney, Agent, or Firm* — Donn K. Harms

(57) ABSTRACT

A device for engagement to and moving of a display case supported by leveling posts extending from the bottom of a support member. The device features a wheeled skate having a fork engageable around the support member and against the frame of the display case. The fork is translatable to an elevated position to elevate the frame of the display case wherein a plurality of the skates, so engaged, will support the display case and allow a rolling thereof. Support members are engageable between each adjacent skate engaged to the display case.

12 Claims, 5 Drawing Sheets

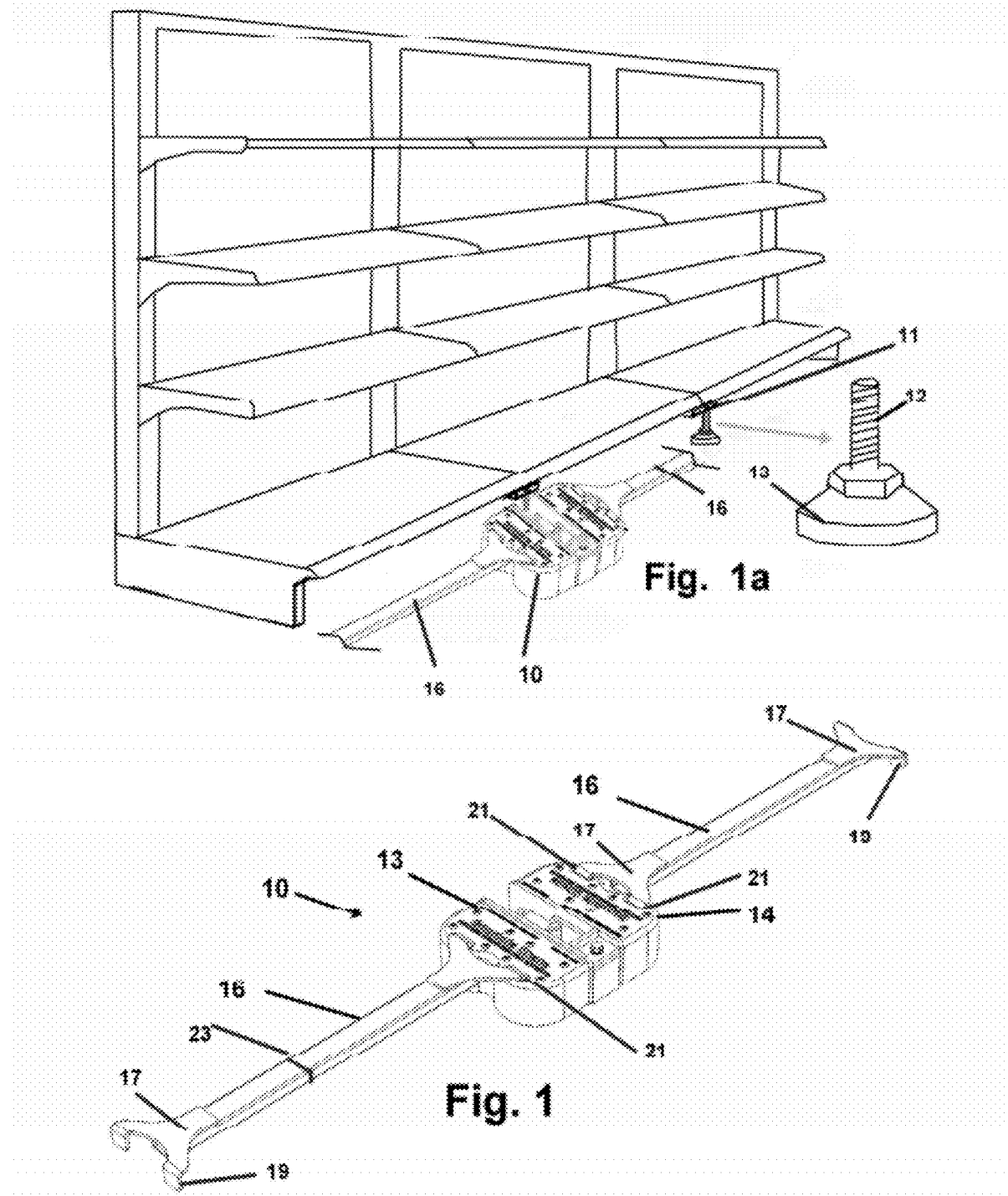

AUTOMATICALLY LOCKING LIFTING SYSTEM FOR DISPLAY CASES

This application claims priority to U.S. Provisional Application No. 61/381,838 filed on Sep. 10, 2010 and incorporated herein in its entirety by reference.

BACKGROUND OF THE INVENTION

1. Field of the Invention

The present invention relates to dollies and devices configured for lifting. More particularly, it relates to dollies employed in the moving of large storage and display structures such as those employed in retail stores, commonly known as gondolas, which employ leveling foot extensions. In addition to lifting fully loaded retail gondolas, the disclosed device is also employable to lift and move file cabinets, shelving, and other such storage and display components which employ such a system of legs for support on a floor surface.

2. Prior Art

Storage and display shelving and cases are an everyday fact of life in a modern society. Because floor space in most retail stores, storage warehouses, and office buildings is at such a premium, the display and storage of merchandise, the storage of files and records, along with storage of an infinite number of other items, has progressed upward.

In order to conserve floor space in retail and commercial situations and to provide customers better viewing and access to products being sold, a system employing multiple horizontal shelves is commonly employed to hold products. In a retail setting such shelf systems are conventionally arranged to form aisles. Customers navigate the retail or wholesale sales store by walking through the aisles and choosing products from the multiple horizontal shelves holding them elevated above the floor. In a commercial or warehouse setting, a similar aisle configuration is conventionally employed. The shelves in this configuration also provide customers and users a much better view of the products being stored. Further, holding capacity of the products in a finite floor space is greatly increased by vertical stacking above a small footprint on the floor.

All such shelving and cabinets, whether in retail stores, warehouses, or offices, must be structurally able to support the load intended. This structural support, being generally metal, along with the products stacked on the elevated horizontal shelves, serves to make the shelf or gondola very heavy. The elevated inventory stacked on the heavy metal gondola or shelf, can increase the total weight of the shelf to a multiple many times that of the shelf structure itself. Such shelving in a retail setting generally provides a means to level out the shelves once installed in the form of a plurality of feet positioned at the distal end of a threaded shaft. The shaft may be rotated to position the feet supporting the shelves, further or closer to the lowest shelf. This allows users of such shelves to level them and elevate the bottom shelf above the floor surface.

For stores and other venues employing shelving for product display, a vexing problem arises when the shelves must be moved. It is preferred not to have to remove the products from the supporting shelves due to the amount of manpower and resulting cost and time and money involved. However the weight, and the fact that the products are elevated on shelves makes movement ungainly with the frequently top-heavy shelves and gondolas. Further, the feet extending from lowest shelf can be a hindrance in engaging lifting components.

A variety of jacks and dollies have been conventionally employed in the past. Many such devices employ vertical support legs with an adjustable leveling foot extending from a bottom end and employed to level the shelves. However, most conventional products used for the purpose fail to provide a unified system of components to lift, move, and subsequently re-place the shelf in position. Instead, conventional systems employ various jacks, forklifts and such for the purpose. This results in much time wasted and often damaged shelving from the ill-designed devices employed.

This is especially true when the moving of shelves is required during the remodeling or renovation of retail stores such as grocery stores, drug stores and the like. During such a remodeling process, it is often necessary to move large display cases, conventionally known as gondolas, which hold everything from tooth paste to canned soup. Moving them generally requires repositioning the shelves or gondolas from one part of the store to another. Often during a store remodeling process, the shelves will need to be moved multiple times to allow for various phases of construction and repositioning of merchandise to new locations.

In some instances, shorter and smaller loaded display cases might be relocated with any suitable lifting apparatus, such as conventional forklifts or floor jacks which place them on conventional flat surfaced dollies for transport. However, most display cases, such as those in grocery store aisles, are very long and not suited for this type of movement. Further, as is normal in retail sales establishments, the display cases are connected together in long sets to form the aisles in the store.

Consequently, transport by floor jack or flat dollies is not an option. Further, because storage and display properties of such display cases generally yield shelves very close to opposing shelves on the same display aisle, frequently there is insufficient room in the aisle formed between adjacent display cases for entry of a forklift or large flat surfaced dolly.

Further, the plurality of extending feet extending between the shelves and the floor must be accommodated. This generally calls for the shelf to be lifted on top of the individual spaced feet, or employing some type of lifting device which will lift the shelf and feet together, and not damage the threaded members extending between the feet and the floor.

As such, there is a continuing unmet need for an improved device and system of interlocking components allowing for an improved method for an easy, quick, and safe movement of large, heavily loaded display cases and gondolas. Such a system should be easily adapted to the job at hand and type of shelving and supports involved.

Still further, such a system should engage the shelving and gondolas in a fashion which will accommodate and not damage the leveling system provided by the feet extending between the floor and the shelving. In doing so, ideally, such a device and system should provide some manner to engage the shelf at a plurality of positions and employ the feet themselves to lock the shelf to the lifting component during movement. This insures the feet are not damaged and that the shelf is securely mounted to each lifting component.

With respect to the above, before explaining at least one preferred embodiment of the shelving lifting system herein in detail or in general, it is to be understood that the invention is not limited in its application to the details of construction and to the arrangement of the components or the steps set forth in the following description or illustrated in the drawings. The various apparatus and methods of the disclosed shelf lifting system related invention are capable of other embodiments, and of being practiced and carried out in various ways, all of which will be obvious to those skilled in the art, once the information herein is reviewed. Also, it is to be understood that the phraseology and terminology employed herein are for the purpose of description and should not be regarded as limiting.

As such, those skilled in the art will appreciate that the conception upon which this disclosure is based may readily be utilized as a basis for designing other shelf lifting and transport systems, and, for carrying out the several purposes of the present disclosed device and method. It is important, therefore, that the embodiments, objects and claims herein, be regarded as including such equivalent construction and methodology insofar as they do not depart from the spirit and scope of the present invention.

SUMMARY OF THE INVENTION

The gondola and shelf device and method herein disclosed and described achieves the above-mentioned goals through the provision of individual dollies or skates, which are engageable to the lower edge of the shelves and/and gondolas in a plurality of positions. Each such skate or gondola is also engageable to adjacent such skates or gondolas to maintain all the skates engaged to a shelf, in a connected and registered position, even during movement of the heavy, product laden shelves.

The disclosed system employs wheeled skates, each of which has an onboard lifting component. Additionally, each skate is configured with components to engage the shelf or gondola at the site of the leveling members. Such leveling members conventionally extend from the bottom frame of the shelf to a foot supporting it on the floor.

The onboard lifting system employs a worm gear which is easily rotated using a wrench. The rotation of the worm gear causes a translation in a fork upward, within a flat form in the frame of the wheeled support skate. The fork is easily positionable in an engagement around the support member supporting the shelf in an elevated position on a foot engaged at the distal end of the adjustable member, which contacts the floor under the shelf.

An especially novel locking system is provided on the wheeled skate. The locking system serves to lock the support member engaged to the shelf or gondola, to the wheeled skate. This locking system engages automatically as the user rotates the geared worm member engaged between the frame of the skate and the translating fork used to lift the shelf.

As the fork translates to an elevated position contacting the underside of the shelf or gondola frame, by employment of the onboard lifting system, a pair of gates automatically translate to a locked or closed position. In this closed position, the threaded support member around which the fork is engaged, is prevented from disengagement from the end of the lifting fork. In turn, the elevated shelf or gondola, which may weigh tons if loaded with merchandise, is also prevented from disengagement from the skate holding it elevated.

Thus, the wheeled skate or dolly employing the onboard means to elevate the fork engaging the shelf at the site of the leveling feet, is automatically locked in position to the shelf without any action on the part of the user. Great utility is thus provided in that each individual skate may be adjusted individually to lift the heavy shelf and maintain it level for movement. Further, users cannot forget to lock the skate in position since the doors providing a means to prevent accidental disengagement of the fork from the shelf. This is especially important when dealing with users unfamiliar with gondola or shelf lifting, or who might be inattentive since the gondolas are automatically locked to the shelf, as the fork is translated upward from the support skate.

The wheels supporting the dolly are preferably casters which are fully swiveling and each dolly has at least two caster style wheel assemblies with each caster sized in accordance with the load to be supported.

Finally, in an especially useful mode of the device, a plurality of horizontally disposable support members are provided. The support members have terminating ends which are engageable to the frames in between each wheeled skate positioned around the perimeter of the base of the shelf being lifted. These members are removably engageable between each adjacent skate to maintain the skates in a registered position relative to the other skates, and the shelf, as the heavy shelving is lifted. This is especially important if the shelf is being moved by pushing it with all of the skates in locked engagement to the base and the shelf or gondola is fully loaded.

With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention.

It is an object of this invention to provide an improved dolly system for the moving of shelving and storage racks, which passively locks in its engagement to the shelf rendering the system a major improvement in safety.

It is an additional object of this invention to provide such a dolly system that provides a passive locking of the dolly to the shelf, when elevated, to prevent accidental release.

A further object of this invention is the provision of such a dolly system that allows for a plurality of such dollies to engage a shelf at multiple positions locked to the shelf and then be engaged to each other, to thereafter allow the raised shelf to be rolled for repositioning.

These together with other objects and advantages which become subsequently apparent reside in the details of the construction and operation as more fully hereinafter described and claimed, reference being had to the accompanying drawings forming a part thereof, wherein like numerals refer to like parts throughout.

BRIEF DESCRIPTION OF DRAWING FIGURES

FIG. 1 depicts a perspective view of a preferred mode of the device showing the dolly with a cover engaged and positioning members extending from each side.

FIG. 1a depicts the device of FIG. 1 being engaged with a conventional gondola or shelf and also shows the adjustable foot component enlarged.

DETAILED DESCRIPTION OF THE PREFERRED EMBODIMENTS OF THE INVENTION

Figure 2A:
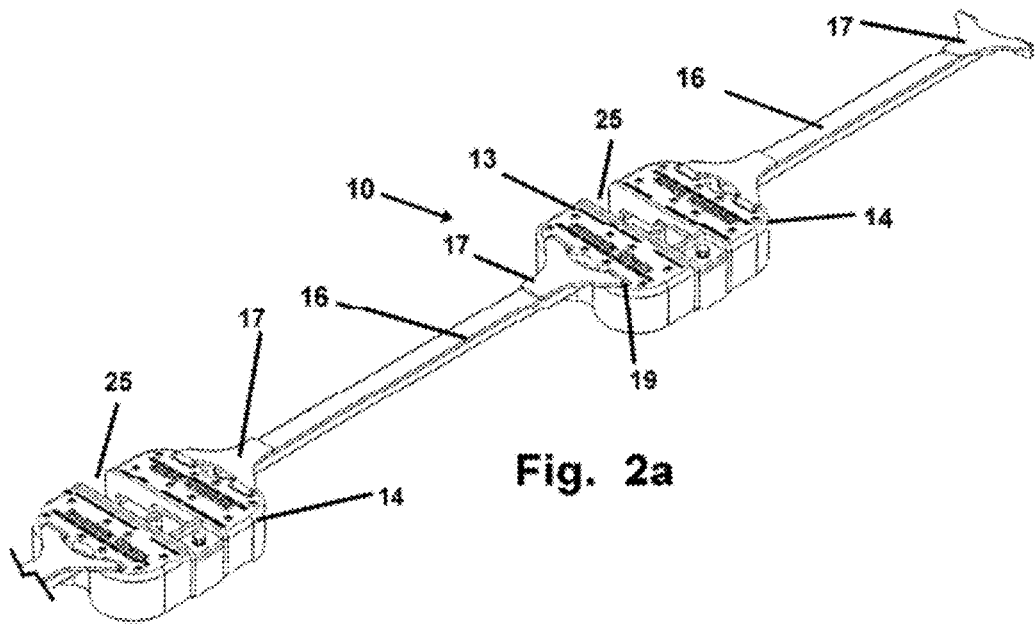
FIG. 2a depicts a plurality of dollies engaged with horizontal members having terminating ends configured to engage with the dolly.

Referring now to the drawings of FIGS. 1-8, the preferred modes of the device 10 and method of employment herein are disclosed. The device 10 and system provided thereby, features an easy to use component system which is employed to safely lift and move conventional gondolas and shelves which employ a frame 11 structure which has a plurality of extending feet 13 supported upon threaded members 12 engaged to the shelf frame 11 for leveling the gondola.

In FIG. 1 there is a perspective view of a preferred mode of the device 10, showing the skate 14 or dolly with a cover 15 engaged. The skate 14 is engageable with a pair or removably engageable horizontal positioning members 16 extending from each side. Connectors 17 have a configuration adapted to removably engaged cooperating connectors on the skate 14. One preferred mode is to employ pin members 19 on the connectors 17 which are configured to engage slots 21 formed on the skates 14, in a downward motion so as to allow the positioning members 16 to be engaged from overhead after the skates 14 engage to the shelf. However, those skilled in the art will realize that any removably engageable connector on the positioning members 16 configured to removably engage cooperating connectors on the skate may be employed, such as clips, sockets and ball, or the like. Any such cooperating connector system as would occur to those skilled in the art is anticipated within the scope of this patent. Further and preferred, the positioning members 16 may be telescopic 23 in a telescopic engagement, to allow means for adjustment of the length of the horizontal members for adjustment thereof to allow for distance differences between skates 14. In this fashion, each skate 14 is removably engageable with the positioning members 16, to maintain a distance between adjacent skates 14, and provide support to allow the plurality of skates 14 to act in concert and as a team, during rolling of the shelf.

Figure 2:
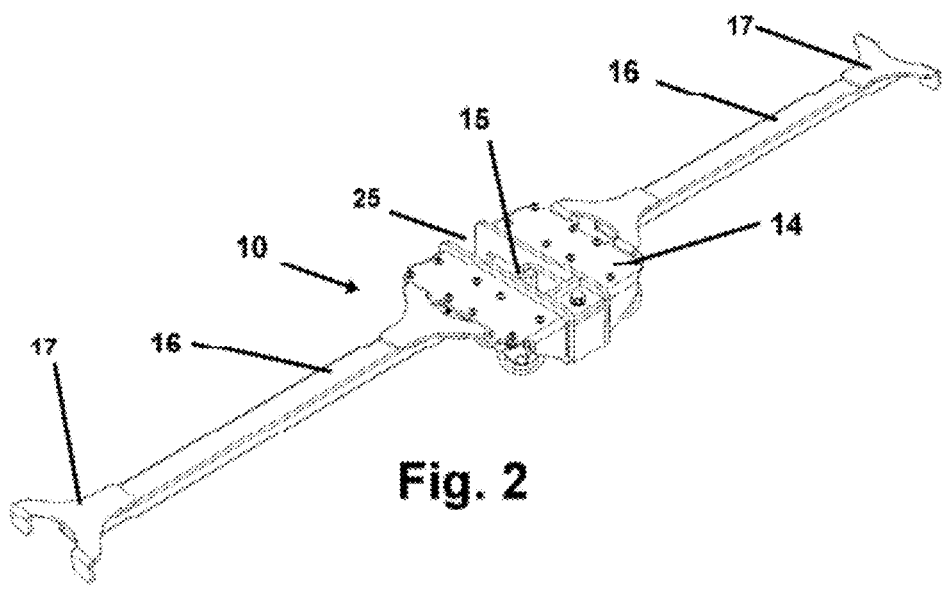
FIG. 2 is a view of FIG. 1 with plastic safety covers removed.
Figure 3:
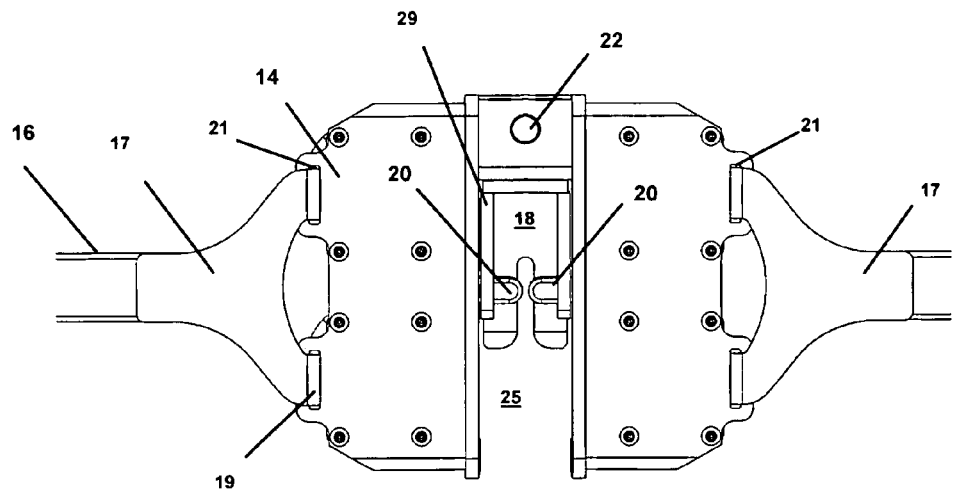
FIG. 3 shows a top view of the dolly of FIG. 2 showing the lifting fork and the lock provided by the gates moved to the engaged position.

In FIG. 2, the underlying support frame 15 of the skate 14 is shown with means of engagement for the positioning members 16. The support frame 15 is generally of steel or carbon fiber or another high tensile material and is operatively engaged to the wheels. Also slidably engaged for vertical movement with the frame 15 is the fork 18 component which is translatable within an elevated cavity 25 formed in the frame 15. The cavity 25 is formed such that it is elevated above the floor and sized to accommodate translation of the forks 18 within.

A top view of FIG. 2 is shown by FIG. 2 which shows the positioning members 16 engaged to slots in the frame 15 of the skate 14 on each side. Also shown are the fork 18 which is translatably engaged to slide on a vertical track in the frame 15. Particularly preferred are a pair of locking gates 20 engaged to translate within apertures 35 formed in support members 29 rising vertically from the planar support surface of the fork 18. Translation of the fork 18 vertically between the frame sidewalls 33 forming the vertical side surfaces of the cavity 25, relative to the supporting frame 15, is actuated by rotation of threaded member 22 with a tool or wrench adapted to engage with the threaded member 22 to actuate such rotation. The threaded member 22 currently is a worm gear having exterior threads 37 cooperatively engaged with a complimentary threaded aperture 41 engaged to a supporting member 51 of the fork 18. The threaded member 22 is held in rotational engagement with plate 53 which is engaged to the frame 15 with fasteners 45. Thus a turning of the threaded member 22 causes a vertical movement of the supporting member 51 and fork 18.

Figure 4:
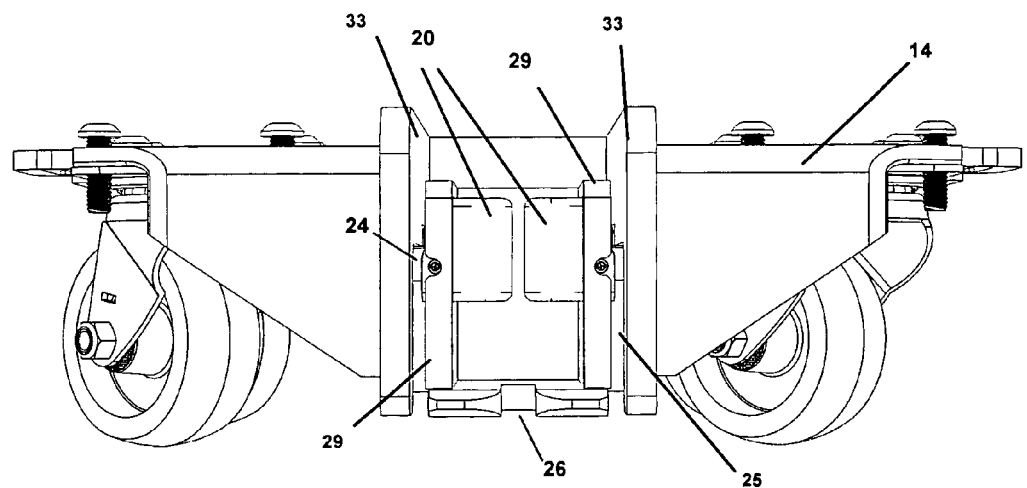
FIG. 4 is a frontal view of the dolly of FIG. 3, showing the self locking gates and the translatable fork member.

In FIG. 4 which is a frontal view of the skate 14, the self locking gates 20 are shown in a locked position through their engagement with the frame 15 when the fork is translated to an engaged position with the bottom of the shelf. A notch 24 in one corner of the gates 20 operationally contacts with the sidewalls 33 of the frame 15 once the fork 18 is translated to elevate the shelf. A slot 26 provides means to engage the shelf with the fork 18 at the extension point of the threaded member 12 (FIG. 6) from the bottom edge of the gondola or shelf.

Figure 5:
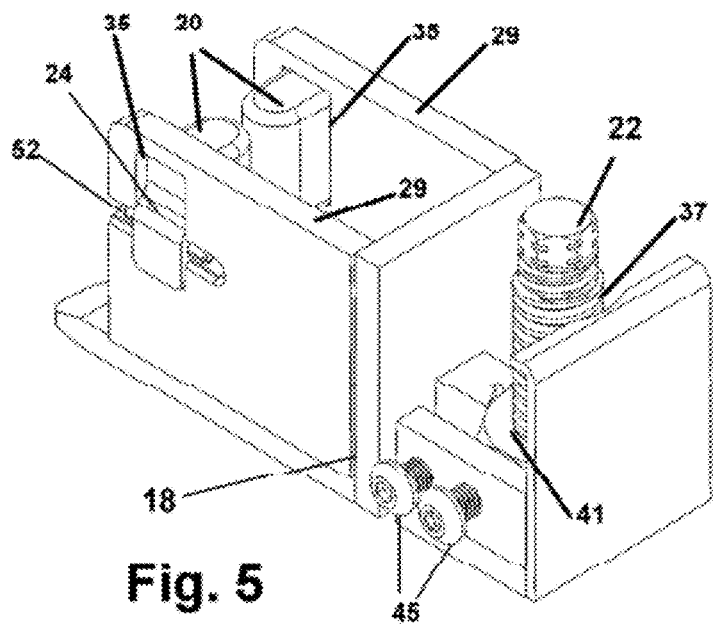
FIG. 5 depicts a perspective view of the lifting fork and threaded member employed to translate it vertically relative to the base which it is engaged and showing the angled surface of the gates which is employed to move them to the closed position while the form is elevated.

FIG. 5 depicts a perspective view of the lifting fork 18 and threaded member 22 which is rotated to vertically translate the engaged fork 18, relative to the frame 15. The notches 24 formed in the gates 20 which contact with the sidewalls 33 of the frame 15 when the fork 18 is elevated, to translate them to closure, are also shown. Means to bias the gates 20 out of the closed position once operative contact with the sidewalls 33 ceases as the fork 18 is lowered, is provided by a spring engaged with a pin 52 to push the gates away from each other once pressure is removed. Of course other biasing means as would occur to those skilled in the art may be employed and are anticipated to be within the scope of this patent.

Figure 6:
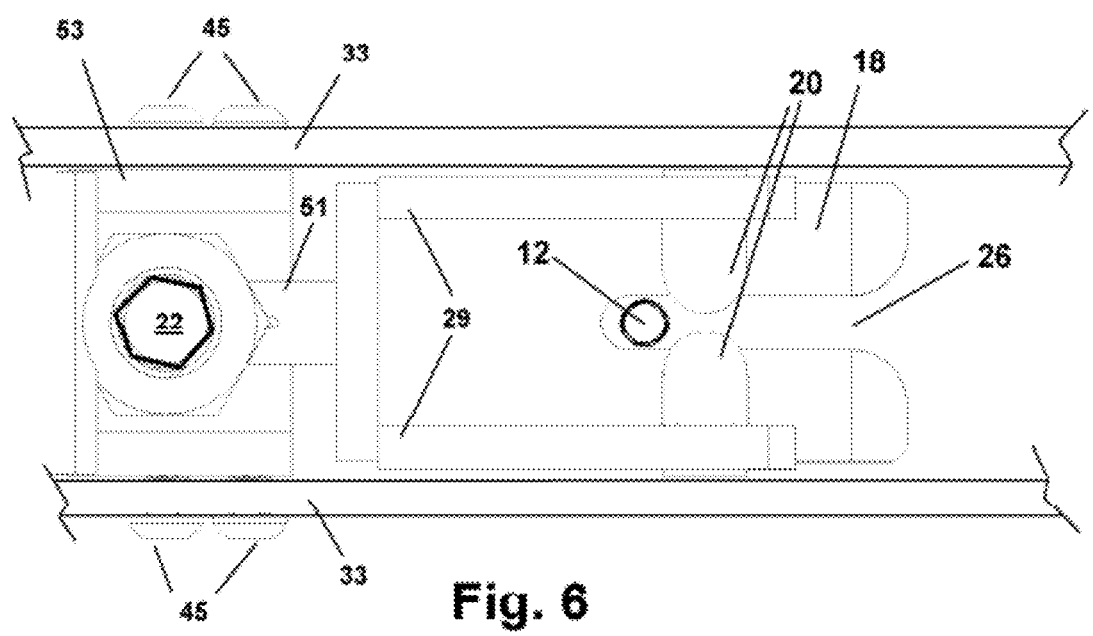
FIG. 6 shows a top view of FIG. 5 and a sectional view of the foot supporting member surrounded by the forks.

FIG. 6 shows top view of FIG. 5 and the slot 26 in the fork 18 which allows the fork 18 to surround the threaded members 12 extending from the support member in the bottom of the shelf and used to level the shelf frame 11 and shelf. The gates 20 are shown translated to the locked position and preventing the threaded member 12 from leaving the slot 26 which effectively locks the skate 14 to the shelf frame 11 and the shelf.

Figure 7:
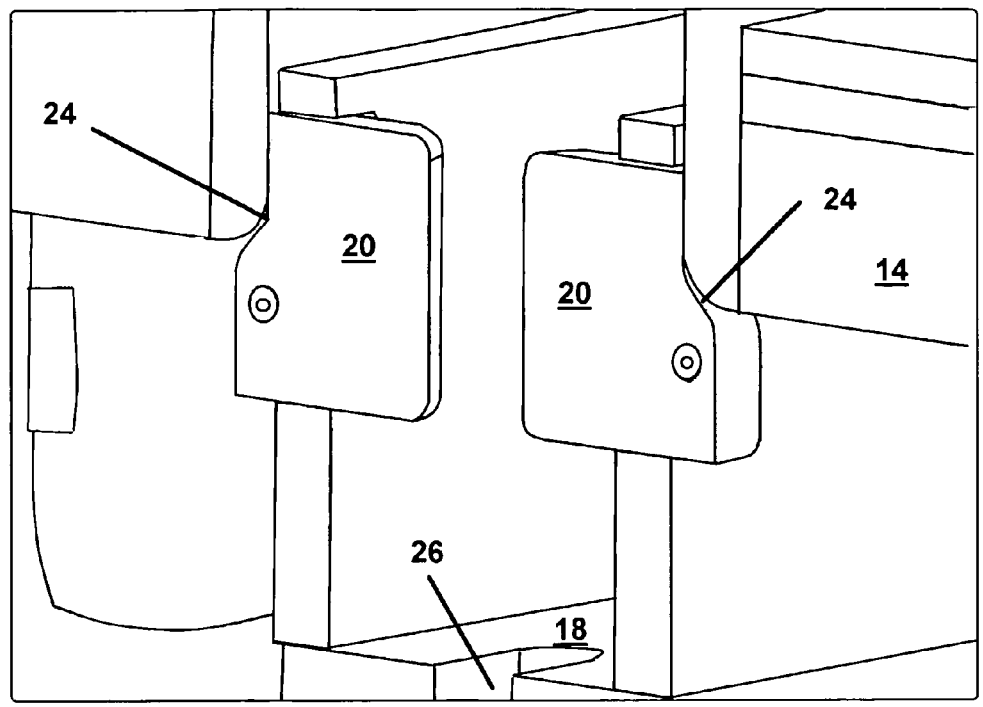
FIG. 7 shows the angled surface formed by a notch formed in a top corner of each locking gate, in an engaged position with the frame of the skate or dolly thereby preventing opening.
Figure 8:
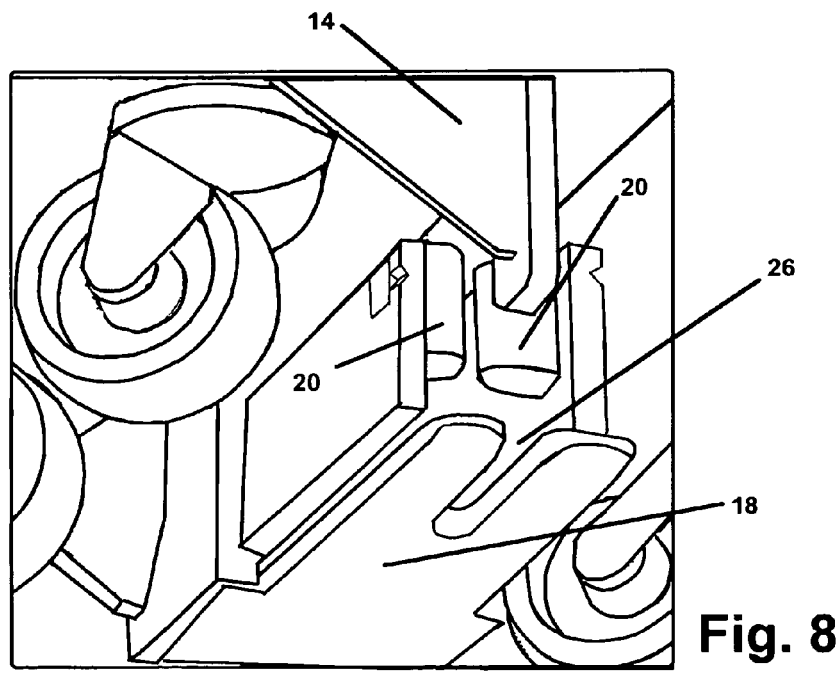
FIG. 8 depicts a lower view of FIG. 7 showing the elevated fork locking the gates closed through engagement of the notch on each gate with the frame.

FIG. 7 shows the angled surface of the notch 24 formed in a top corner of each locking gate 20 in an engaged position with the sidewall 33 of the frame 15 of the skate 14 or dolly thereby preventing opening. A similar configuration is shown in FIG. 8 from a lower view of FIG. 7. Upon upward translation of the fork 18 component, by rotation of the threaded member 22, contact with the sidewalls 33 of the frame causes a translation of the gates 22 closed. This reverses on a lowering of the fork 18 from the biasing components of the gates 22 translating them to an open position.

While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. An apparatus for moving a display case supported by leveling posts extending from the bottom of a support member of said display case to a support surface, comprising:
   a skate having a frame supported by wheels, said skate adapted for a rolling thereof on said support surface;
   a fork component, said fork component translateably engaged with said skate;
   means for a translation of said fork component in a direction normal to said support surface, between a first position closest to said support surface, and an elevated position;
   a slot in said fork component configured to surround said leveling posts;
   said slot positioned to surround said leveling posts when by a movement of said skate with said fork component in said first position, to position said fork component under said support member;
   said fork component contacting and elevating said support member of said display case by said translation of said fork component to said elevated position;
   a pair of gates, slidably engaged adjacent to a distal end of said fork component;
   said gates having an open position with a gap therebetween when said fork is in said first position thereby allowing a passage of said support member therethrough;
   said crates having a closed position wherein said gap is sized smaller than a diameter of said support member;
   said gates moving to said closed position when said fork component moves to said elevated position; and
   said gates in said closed position forming a means for retaining said support member in a locked engagement with said display case; and whereby said case is supportable upon a plurality of said skates have respective said fork components in said elevated position and said case is rollable upon said skates.

2. The apparatus for moving a display case of claim 1, additionally comprising:
   said fork component positioned within a cavity between two opposing sidewalls of said frame;
   said gates moving to said closed position through an action of means for translation of distal ends of said gates toward each other; and
   said means for translation of said distal ends of said gates toward each other activated by a contact of a respective gate with a respective said sidewall of said frame, whereby said means for retaining said support member in said locked engagement with said display case is activated passively during movement of said fork component to said elevated position.

3. The apparatus for moving a display case of claim 2, wherein said means for translation of said distal ends of said gates toward each, comprises:
   a notch in a respective side edge opposite said distal edge of each respective said gate;
   said notch having an angled surface leading from a top surface of said gate; and
   contact with a respective adjacent sidewall by a respective angled surface of each said gate, during translation of said fork component to said elevated position causing a respective translation of said gate toward an opposing said gate.

4. The apparatus for moving a display case of claim 1, wherein said means for a translation of said fork component in a direction normal to said support surface, between said first position closest to said support surface, and said elevated position, comprises:
   a member having a geared exterior rotationally engaged with an aperture attached to said fork component, said aperture having a geared interior surface, said geared interior surface being cooperatively engageable with said geared exterior;
   said member rotationally connected with said frame; and
   whereby a rotation of said member causes a riding of said geared interior surface thereon, to thereby impart a translation of said fork component in a direction normal to said support surface.

5. The apparatus for moving a display case of claim 2, wherein said means for a translation of said fork component in a direction normal to said support surface, between said first position closest to said support surface, and an said elevated position, comprises:
   a member having a geared exterior rotationally engaged with an aperture attached to said fork component, said aperture having a geared interior surface, said geared interior surface being cooperatively engageable with said geared exterior;
   said member rotationally connected with said frame; and
   whereby a rotation of said member causes a riding of said geared interior surface thereon, to thereby impart a translation of said fork component in a direction normal to said support surface.

6. The apparatus for moving a display case of claim 3, wherein said means for a translation of said fork component in a direction normal to said support surface, between said first position closest to said support surface, and said elevated position, comprises:
   a member having a geared exterior rotationally engaged with an aperture attached to said fork component, said aperture having a geared interior surface, said geared interior surface being cooperatively engageable with said geared exterior;
   said member rotationally connected with said frame; and
   whereby a rotation of said member causes a riding of said geared interior surface thereon, to thereby impart a translation of said fork component in a direction normal to said support surface.

7. The apparatus for moving a display case of claim 1, additionally comprising:
   one or a plurality of support members;
   said support members having an engagement component at both ends;
   said engagement components being removably engageable with a cooperative engagement mount of said skate;
   said support member engageable to an engaged position between two adjacent skates through an engagement of a respective engagement component with a respective cooperative engagement mount of each respective skate; and
   said support member in said engaged position providing means to maintain said adjacent skates in registered positions to each other during a rolling of said case with said skates engaged thereto in respective elevated positions.

8. The apparatus for moving a display case of claim 2, additionally comprising:
- one or a plurality of support members;
- said support members having an engagement component at both ends;
- said engagement components being removably engageable with a cooperative engagement mount of said skate;
- said support member engageable to an engaged position between two adjacent skates through an engagement of a respective engagement component with a respective cooperative engagement mount of each respective skate; and
- said support member in said engaged position providing means to maintain said adjacent skates in registered positions to each other during a rolling of said case with said skates engaged thereto in respective elevated positions.

9. The apparatus for moving a display case of claim 3, additionally comprising:
- one or a plurality of support members;
- said support members having an engagement component at both ends;
- said engagement components being removably engageable with a cooperative engagement mount of said skate;
- said support member engageable to an engaged position between two adjacent skates through an engagement of a respective engagement component with a respective cooperative engagement mount of each respective skate; and
- said support member in said engaged position providing means to maintain said adjacent skates in registered positions to each other during a rolling of said case with said skates engaged thereto in respective elevated positions.

10. The apparatus for moving a display case of claim 4, additionally comprising:
- one or a plurality of support members;
- said support members having an engagement component at both ends;
- said engagement components being removably engageable with a cooperative engagement mount of said skate;
- said support member engageable to an engaged position between two adjacent skates through an engagement of a respective engagement component with a respective cooperative engagement mount of each respective skate; and
- said support member in said engaged position providing means to maintain said adjacent skates in registered positions to each other during a rolling of said case with said skates engaged thereto in respective elevated positions.

11. The apparatus for moving a display case of claim 5, additionally comprising:
- one or a plurality of support members;
- said support members having an engagement component at both ends;
- said engagement components being removably engageable with a cooperative engagement mount of said skate;
- said support member engageable to an engaged position between two adjacent skates through an engagement of a respective engagement component with a respective cooperative engagement mount of each respective skate; and
- said support member in said engaged position providing means to maintain said adjacent skates in registered positions to each other during a rolling of said case with said skates engaged thereto in respective elevated positions.

12. The apparatus for moving a display case of claim 6, additionally comprising:
- one or a plurality of support members;
- said support members having an engagement component at both ends;
- said engagement components being removably engageable with a cooperative engagement mount of said skate;
- said support member engageable to an engaged position between two adjacent skates through an engagement of a respective engagement component with a respective cooperative engagement mount of each respective skate; and
- said support member in said engaged position providing means to maintain said adjacent skates in registered positions to each other during a rolling of said case with said skates engaged thereto in respective elevated positions.

\* \* \* \* \*